No. 768,455. Patented August 23, 1904.

UNITED STATES PATENT OFFICE.

BENNO HOMOLKA, OF FRANKFORT-ON-THE-MAIN, AND FRIEDRICH VON BOLZANO, OF HÖCHST-ON-THE-MAIN, GERMANY, ASSIGNORS TO FARB-WERKE, VORM. MEISTER, LUCIUS & BRÜNING, OF HÖCHST-ON-THE-MAIN, GERMANY, A CORPORATION OF GERMANY.

GLYCOLLIC ACID ANILID-ORTHOCARBOXYLIC ACID AND PROCESS OF MAKING INDIGO.

SPECIFICATION forming part of Letters Patent No. 768,455, dated August 23, 1904.

Application filed February 16, 1904. Serial No. 193,898. (Specimens.)

*To all whom it may concern:*

Be it known that we, BENNO HOMOLKA, Ph. D., a citizen of the Empire of Germany, residing at Frankfort-on-the-Main, and FRIED-RICH VON BOLZANO, Ph. D., a citizen of the Empire of Austria-Hungary, residing at Hochst-on-the-Main, Germany, have invented certain new and useful Improvements in the Manufacture of Indigo, of which the following is a specification.

We have found that the product obtained by heating together anthranilic acid and glycollid according to the formula

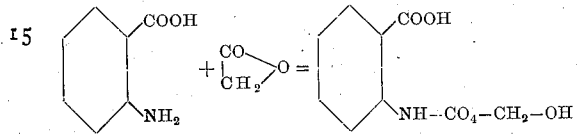

and which may be considered as glycollic acid anilid orthocarboxylic acid, yields when heated with caustic alkalies an indigo leuco body which on being dissolved in water may be oxidized to indigo in the usual manner.

The process may be carried out, for instance, as follows: One hundred parts, by weight, of anthranilic acid and forty parts, by weight, of glycollid are fused together in a suitable vessel, and the mass is then heated to 180° to 200° centigrade for some hours. The crude glycollic acid anilid orthocarboxylic acid thus obtained is purified by recrystallization from hot water, forming colorless crystals, which melt at 167° centigrade. They are little soluble in cold, abundantly soluble in hot water, and easily soluble in the usual organic solvents—for instance, in alcohol, ether, and acetone. One hundred parts, by weight, of the potassium or sodium salt of this acid (or a mixture of both salts) are then heated with three hundred parts of potassium or sodium hydroxid, or a mixture thereof, to about 240° to 300° centigrade until the product assumes a deep orange-yellow color, and a test portion of same dissolves in water to a solution from which indigo abundantly separates when it is exposed to the air. The mass is then allowed to cool, dissolved in about four thousand parts of water, and the indigo is separated in the usual manner—for instance, by introducing air.

Having now described our invention, what we claim is—

1. The herein-described process for the manufacture of indigo which consists in heating the glycollic acid anilid orthocarboxylic acid in form of its alkali salts, obtained by the fusion of anthranilic acid and glycollid, with caustic alkalies and in oxidizing the indigo leuco body thus obtained in aqueous solution to indigo in the usual manner, substantially as set forth.

2. As a new product the glycollic acid anilid orthocarboxylic acid, being colorless crystals of the melting-point 167° centigrade, little soluble in cold, abundantly soluble in hot water, easily soluble in alcohol, ether and acetone.

In testimony that we claim the foregoing as our invention we have signed our names in presence of two subscribing witnesses.

BENNO HOMOLKA.
FRIEDRICH VON BOLZANO.

Witnesses:
ALFRED BRISBOIS,
JOHANN HARTENSTEIN.